US012009005B2

(12) United States Patent
Thiemt et al.

(10) Patent No.: US 12,009,005 B2
(45) Date of Patent: Jun. 11, 2024

(54) METHOD FOR RATING THE SPEECH QUALITY OF A SPEECH SIGNAL BY WAY OF A HEARING DEVICE

(71) Applicant: SIVANTOS PTE. LTD., Singapore (SG)

(72) Inventors: Jana Thiemt, Erlangen (DE); Marko Lugger, Weilersbach (DE)

(73) Assignee: Sivantos Pte. Ltd., Singapore (SG)

(*) Notice: Subject to any disclaimer, the term of this patent is extended or adjusted under 35 U.S.C. 154(b) by 325 days.

(21) Appl. No.: 17/460,555

(22) Filed: Aug. 30, 2021

(65) Prior Publication Data

US 2022/0068294 A1 Mar. 3, 2022

(30) Foreign Application Priority Data

Aug. 28, 2020 (DE) ..................... 10 2020 210 919.2

(51) Int. Cl.
*G10L 21/0272* (2013.01)
*G10L 21/0364* (2013.01)
(Continued)

(52) U.S. Cl.
CPC .......... *G10L 21/0364* (2013.01); *G10L 25/60* (2013.01); *G10L 25/84* (2013.01);
(Continued)

(58) Field of Classification Search
CPC .............. H04R 25/606; H04R 2225/41; H04R 2225/43; H04R 25/03; H04R 2225/67;
(Continued)

(56) References Cited

U.S. PATENT DOCUMENTS

| | | | |
|---|---|---|---|
| 7,165,025 | B2 | 1/2007 | Kim |
| 2004/0167774 | A1 | 8/2004 | Shrivastav |

(Continued)

OTHER PUBLICATIONS

Heidemann Andersen, A. et al. "Nonintrusive Speech Intelligibility Prediction Using Convolutional Neural Networks" In: IEEE Transactions on Audio, Speech, and Language Processing, vol. 26, 2018, No. 10, S. 1925-1939.—ISSN: 1558-7916.

*Primary Examiner* — Jakieda R Jackson
(74) *Attorney, Agent, or Firm* — Laurence A. Greenberg; Werner H. Stemer; Ralph E. Locher

(57) ABSTRACT

A method for rating the speech quality of a speech signal by a hearing device. An acousto-electric input transducer records sound containing the speech signal and converts it into an input audio signal. At least one articulatory and/or prosodic property of the speech signal is quantitatively acquired through analysis of the input audio signal, and a quantitative measure of speech quality is derived based on the articulatory and/or prosodic property. A hearing device with an acousto-electric input transducer configured to record a sound and convert it into an input audio signal, and a signal processing apparatus that is designed to quantitatively acquire at least one articulatory and/or prosodic property of a component, contained in the input audio signal, of a speech signal based on analysis of the input audio signal and to derive a quantitative measure of the speech quality based on the at least one articulatory and/or prosodic property.

14 Claims, 2 Drawing Sheets

(51) Int. Cl.

| | |
|---|---|
| ***G10L 25/60*** | (2013.01) |
| ***G10L 25/84*** | (2013.01) |
| ***H04R 25/00*** | (2006.01) |

(52) U.S. Cl.
CPC ......... *H04R 25/405* (2013.01); *H04R 25/407* (2013.01); *H04R 25/43* (2013.01); *H04R 25/505* (2013.01); *H04R 2225/43* (2013.01)

(58) Field of Classification Search
CPC .... H04R 25/405; H04R 25/407; H04R 25/43; H04R 25/505; G10L 25/78; G10L 25/60; G10L 15/1807; G10L 15/02; G10L 21/0364; G10L 25/84
See application file for complete search history.

(56) References Cited

U.S. PATENT DOCUMENTS

| | | | | |
|---|---|---|---|---|
| 2014/0336448 | A1* | 11/2014 | Banna ................ | A61N 1/36038 607/57 |
| 2015/0367132 | A1* | 12/2015 | Milczynski .......... | A61N 1/0541 607/3 |
| 2016/0261959 | A1* | 9/2016 | Harczos ............... | H04R 25/353 |
| 2018/0125415 | A1* | 5/2018 | Reed .................... | A61B 5/4803 |
| 2018/0255406 | A1 | 9/2018 | Sorensen et al. | |

* cited by examiner

METHOD FOR RATING THE SPEECH QUALITY OF A SPEECH SIGNAL BY WAY OF A HEARING DEVICE

CROSS-REFERENCE TO RELATED APPLICATION

This application claims the priority, under 35 U.S.C. § 119, of German patent application DE 10 2020 210 919.2, filed Aug. 28, 2020; the prior application is herewith incorporated by reference in its entirety.

FIELD AND BACKGROUND OF THE INVENTION

The invention relates to a method for rating the speech quality of a speech signal by way of a hearing device, wherein an acousto-electric input transducer of the hearing device records a sound containing the speech signal from surroundings of the hearing device and converts it into an input audio signal, wherein at least one property of the speech signal is quantitatively acquired through analysis of the input audio signal by way of a signal processing operation.

One important objective in the application of hearing devices, such as for example hearing aids, but also headsets or communication devices, is often that of outputting a speech signal as precisely as possible, that is to say in particular in a manner as acoustically intelligible as possible, to a user of the hearing device. For this purpose, in an audio signal that is generated based on a sound containing a speech signal, interfering noise is often suppressed from the sound in order to emphasize the signal components that represent the speech signal and thus improve intelligibility thereof. However, noise suppression algorithms may often reduce the sound quality of a resultant output signal, with artefacts in particular possibly arising due to a signal processing of the audio signal, and/or an auditory impression is generally perceived as being less natural.

Noise suppression is usually performed here based on characteristic variables that primarily concern noise or the overall signal, that is to say for example a signal-to-noise ratio (SNR), a noise floor, or else a level of the audio signal. This approach to controlling noise suppression may however ultimately lead to noise suppression being applied even when this would absolutely not be necessary, even though there is considerable interfering noise, because the speech components are still easily understandable in spite of the interfering noise. In this case, this introduces the risk of worsening sound quality, for example caused by noise suppression artefacts, without this really being necessary. On the other hand, a speech signal that is overlaid only with little noise, and in this respect the associated audio signal has a good SNR, may also have a low speech quality when the speaker has poor articulation.

This could be avoided if specifically noise suppression algorithms, but also the signal processing operation in general, were to be controlled on the basis of a quality of a speech signal component in the audio signal to be processed in a hearing device. For this purpose, it is however necessary to make such a quality measurable and acquirable in the first place.

SUMMARY OF THE INVENTION

The invention is therefore based on the object of specifying a method by way of which a speech component in an audio signal to be processed by a hearing device is able to be rated objectively in terms of its quality. The invention is furthermore based on the object of specifying a hearing device that is designed, for an internal audio signal, to objectively rate a quality of a speech component contained therein.

With the above and other objects in view there is provided, in accordance with the invention, a method for rating a speech quality of a speech signal by a hearing device, the method which comprises:

- recording a sound with an acousto-electric input transducer of the hearing device, the sound containing the speech signal from surroundings of the hearing device, and converting the sound into an input audio signal;
- quantitatively acquiring at least one articulatory property and/or prosodic feature of the speech signal through analysis of the input audio signal by a signal processing operation, and
- deriving a quantitative measure of the speech quality based on the at least one articulatory property and/or prosodic feature.

In other words, the first above-named object is achieved, according to the invention, by way of a method for rating the speech quality of a speech signal by way of a hearing device, wherein an acousto-electric input transducer of the hearing device records a sound containing the speech signal from surroundings of the hearing device and converts it into an input audio signal, wherein at least one articulatory and/or prosodic property/prosodic feature of the speech signal is quantitatively acquired through analysis of the input audio signal by way of a signal processing operation, in particular a signal processing operation of the hearing device and/or of an auxiliary device able to be connected to the hearing device, and wherein a quantitative measure of the speech quality is derived on the basis of the at least one articulatory and/or prosodic property. Advantageous embodiments, some of which are inventive on their own, are the subject of the dependent claims and the following description.

The second object is achieved, according to the invention, by way of a hearing device that comprises an acousto-electric input transducer and a signal processing apparatus in particular having a signal processor, wherein the acousto-electric input transducer is designed to record a sound from surroundings of the hearing device and to convert it into an input audio signal, and wherein the signal processing apparatus is designed to quantitatively acquire at least one articulatory and/or prosodic property of a component, contained in the input audio signal, of a speech signal through analysis of the input audio signal and to derive a quantitative measure of the speech quality on the basis of the at least one articulatory and/or prosodic property.

The hearing device according to the invention shares the advantages of the method according to the invention, which is able to be performed in particular by way of the hearing device according to the invention. The advantages mentioned below for the method and for its developments may be transferred analogously in this case to the hearing device.

An acousto-electric input transducer is in this case understood in particular to comprise any transducer that is designed to generate an electrical audio signal from a sound from the surroundings, such that sound-induced air movements and air pressure fluctuations at the location of the transducer are reproduced through corresponding oscillations of an electrical variable, in particular a voltage in the generated audio signal. The acousto-electric input transducer may in particular be a microphone.

The signal processing operation is performed in particular by way of an appropriate signal processing apparatus that is designed to perform the calculations and/or algorithms required for the signal processing operation by way of at least one signal processor. The signal processing apparatus is in this case in particular arranged on the hearing device. The signal processing apparatus may however also be arranged on an auxiliary device that is designed for connection to the hearing device in order to exchange data, that is to say for example a smartphone, a smartwatch or the like. The hearing device may then for example transmit the input audio signal to the auxiliary device, and the analysis is performed by way of the computing resources provided by the auxiliary device. The quantitative measure may finally be transmitted back to the hearing device as the result of the analysis.

The analysis may in this case be performed directly on the input audio signal, or based on a signal derived from the input audio signal. Such a derived signal may in this case in particular be the isolated speech signal component, but also an audio signal as may be generated for example in a hearing device by a feedback loop by way of a compensation signal for compensating acoustic feedback or the like, or by a directional signal that is generated on the basis of a further input audio signal of a further input transducer.

An articulatory property of the speech signal in this case comprises in particular a precision of formants, in particular vowels, and a dominance of consonants, in particular fricatives and/or plosives. This makes it possible to make a statement that a speech quality is deemed to be higher the higher the precision of the formants or the higher the dominance and/or precision of consonants. A prosodic property/prosodic feature of the speech signal in particular comprises a temporal stability of a fundamental frequency of the speech signal and a relative acoustic intensity of accents.

Noise generation conventionally involves three physical components of a sound source: A mechanical oscillator, such as for example a string or diaphragm, which sets air surrounding the oscillator in vibration, an excitation of the oscillator (for example through plucking or striking), and a resonant body. The oscillator is set in oscillation by the excitation, such that the air surrounding the oscillator is set in pressure vibrations through the vibrations of the oscillator, these pressure vibrations propagating in the form of sound waves. In this case, mostly not just vibrations of a single frequency are excited in the mechanical oscillator, but also vibrations of different frequencies, with the spectral composition of the propagating vibrations defining the overall sound. The frequencies of particular vibrations are in this case often in the form of integer multiples of a fundamental frequency and are referred to as "harmonics" of this fundamental frequency. More complex spectral patterns may however also develop, meaning that not all of the generated frequencies are able to be represented as harmonics of the same fundamental frequency. The resonance of the generated frequencies in the resonance space is also relevant here to the overall sound, since particular frequencies generated by the oscillator in the resonance space are often attenuated in relation to the dominant frequencies of a sound.

Applied to the human voice, this means that the mechanical oscillator is defined by the vocal cords, and the excitation thereof in the air flowing out of the lungs and past the vocal cords, wherein the resonance space is formed primarily by the throat and oral cavity. The fundamental frequency of a male voice is in this case mainly in the range from 60 Hz to 150 Hz, and for women mainly in the range from 150 Hz to 300 Hz. Due to the anatomical differences between individual people both in terms of their vocal cords and in particular in terms of the throat and oral cavity, voices that initially sound different are formed. The resonance space is in this case able to be changed by changing the volume and the geometry of the oral cavity through appropriate jaw and lip movements, giving rise to frequencies characteristic for the generation of vowels, what are known as formants. These are each located in unchangeable frequency ranges for individual vowels (known as the "formant ranges"), wherein a vowel is usually already clearly audibly delimited from other sounds by the first two formants F1 and F2 of a series of often four formants (cf. "vowel triangle" and "vowel trapezium"). The formants are in this case formed independently of the fundamental frequency, that is to say the frequency of the fundamental vibration.

Precision of formants should in this sense be understood to mean in particular a degree of concentration of acoustic energy on formant ranges able to be distinguished from one another, in particular in each case on individual frequencies in the formant ranges, and a resulting ability to discern the individual vowels on the basis of the formants.

To generate consonants, the airflow flowing past the vocal cords is partially or fully blocked at least one point, resulting inter alia also in the formation of turbulence in the airflow, for which reason only some consonants are able to be assigned a formant structure similarly clear to vowels, and other consonants have a more wideband frequency structure. However, consonants may also be assigned particular frequency bands in which the acoustic energy is concentrated. Due to the more percussive "noise property" of consonants, these are generally above the formant ranges of vowels, specifically primarily in the range of around 2 to 8 kHz, while the ranges of the most important formants F1 and F2 of vowels generally end at around 1.5 kHz (F1) or 4 kHz (F2). The precision of consonants is defined in this case in particular by a degree of concentration of the acoustic energy on the corresponding frequency ranges and a resultant ability to discern the individual consonants.

The ability to distinguish between the individual components of a speech signal, and thus the possibility of being able to resolve these components, does not however depend solely on articulatory aspects. While these primarily concern the acoustic precision of the smallest isolated sound events of speech, known as phonemes, prosodic aspects also define the speech quality, since in this case a statement is able to be given a particular meaning through intonation and accentuation, in particular across several segments, that is to say several phonemes or phoneme groups, such as for example by raising the pitch at the end of a sentence to specify a question or by emphasizing a specific syllable in a word in order to distinguish between different meanings (cf. "drive around" versus "drive around") or emphasizing a word in order to highlight it. In this respect, it is possible to quantitatively acquire a speech quality for a speech signal also based on prosodic properties, in particular as mentioned above, by determining for example measures of a temporal variation of the pitch of the voice, that is to say its fundamental frequency, and for distinctness lowering of the amplitude and/or level maxima.

Based on one or more of said and/or further quantitatively acquired articulatory and/or prosodic properties of the speech signal, it is thus possible to derive the quantitative measure of the speech quality.

A characteristic variable correlated with the precision of predefined formants of vowels in the speech signal, a characteristic variable correlated with the dominance of consonants, in particular fricatives, in the speech signal and/or a characteristic variable correlated with the precision of the transitions from voiced and unvoiced sounds is preferably acquired in this case as articulatory property of the speech signal. The quantitative measure of the speech quality may then be formed in each case directly by said acquired characteristic variable or be formed based thereon, for example by weighting two characteristic variables for different formants or the like, or else by weighting, that is to say weighted averaging, of at least two different ones of said characteristic variables with respect to one another. The quantitative measure of the speech quality thus refers in this case to the speech production of a speaker who may exhibit deficits (such as for example lisping or mumbling) as far as speech impediments from pronunciation perceived as being "clean" and that accordingly reduce the speech quality.

In contrast to variables relating to propagation of speech in surroundings, such as for example the speech intelligibility index (SII), which weights the individual speech and noise components in bands, or the speech transmission index (STI), which acquires the effect of a transmission channel on the modulation depth by way of a test signal replicating the modulations of human speech, the present measure here for the is in this case in particular independent of the external properties of a transmission channel, such as for example a propagation in a possibly echoey space or loud surroundings, rather preferably only dependent on the intrinsic properties of the speech generation of the speaker.

This means in particular that, in quiet surroundings and/or surroundings containing only little background noise, it is possible to identify a reduced speech quality (with reference to a reference value that is preferably defined for a speech quality perceived as "very good").

Expediently in this case, in order to acquire the characteristic variable correlated with the dominance of consonants in the speech signal, a first energy contained in a low frequency range is calculated, a second energy contained in a frequency range higher than the low frequency range is calculated, and the correlated characteristic variable is formed based on a ratio, and/or a ratio weighted over the respective bandwidths of said frequency ranges, of the first energy and the second energy. Temporal smoothing of the speech signal may in this case in particular be performed beforehand. In order to calculate the first and the second energy, the input audio signal may in particular be split into the low and the higher frequency range, for example by way of a filter bank and possibly by way of appropriate selection of individual resultant frequency bands. The low frequency range is preferably selected such that it lies within the frequency interval [0 Hz, 2.5 kHz], preferably within the frequency interval [0 Hz, 2 kHz]. The higher frequency range is preferably selected such that it lies within the frequency interval [3 kHz, 10 kHz], preferably within the frequency interval [4 Hz, 8 kHz].

It proves to be even more advantageous if, in order to acquire the characteristic variable correlated with the precision of the transitions from voiced and unvoiced sounds, a distinction is made between voiced and unvoiced temporal sequences based on a correlation measurement and/or based on a zero crossing rate of the input audio signal or of a signal derived from the input audio signal, a transition from a voiced temporal sequence to an unvoiced temporal sequence or from an unvoiced temporal sequence to a voiced temporal sequence is ascertained, the energy contained in the voiced or unvoiced temporal sequence prior to the transition is ascertained for at least one frequency range, and the energy contained in the unvoiced or voiced temporal sequence following the transition is ascertained for the at least one frequency range, and the characteristic variable is ascertained based on the energy prior to the transition and based on the energy following the transition.

This means in particular: The voiced and unvoiced temporal sequences of the speech signal in the input audio signal are first of all ascertained, and a transition from voiced to unvoiced or from unvoiced to voiced is identified therefrom. For at least one frequency range, in particular predefined based on empirical findings for the precision of the transitions, the energy prior to the transition in the frequency range for the input audio signal or for a signal derived therefrom is then ascertained. This energy may for example be taken across the voiced or unvoiced temporal sequence immediately prior to the transition. The energy in the relevant frequency range is likewise ascertained following the transition, that is to say for example across the unvoiced or voiced temporal sequence following the transition.

Based on these two energies, it is then possible to ascertain a characteristic value that allows in particular a statement about a change of the energy distribution at the transition. This characteristic value may for example be determined as a quotient or a relative difference between the two energies prior to and following the transition. The characteristic value may however also be formed as a comparison between the energy prior to and following the transition and the overall (wideband) signal energy. The energies may however in particular also be ascertained for a further frequency range in each case prior to and following the transition, such that the characteristic value is additionally able to be ascertained in the further frequency band based on the energies prior to and following the transition, for example as a rate of change of the energy distribution into the involved frequency ranges across the transition (that is to say a comparison between the distribution of the energies in both frequency ranges prior to the transition and the distribution following the transition).

The characteristic variable, correlated with the precision of the transitions, for the measure of the speech quality may then be ascertained based on said characteristic value. To this end, the characteristic value may be used directly, or the characteristic value may be compared with a reference value ascertained beforehand for good articulation, in particular based on corresponding empirical findings (for example as a quotient or relative difference). The specific embodiment, in particular in terms of the frequency ranges and limit or reference values to be used, may generally be achieved based on empirical results regarding a corresponding significance of the respective frequency bands or groups of frequency bands. Frequency bands 13 to 24, preferably 16 to 23 of the Bark scale may in particular be used here as the at least one frequency range. A frequency range of lower frequencies may in particular be used as a further frequency range.

In order to acquire the characteristic variable correlated with the precision of predefined formants of vowels in the speech signal, the acoustic energies, concentrated in at least two different formant ranges, of the speech signal (or variables correlated with said energies) are preferably compared with one another. Particularly preferably, a signal component of the speech signal in at least one formant range in the frequency space is ascertained, a signal variable correlated with the level is ascertained for the signal component of the speech signal in the at least one formant range, and the characteristic variable is ascertained based on a maximum value and/or based on a temporal stability of the signal variable correlated with the level. The frequency range of the first formants F1 (preferably 250 Hz to 1 kHz, more preferably 300 Hz to 750 Hz) or of the second formants F2 (preferably 500 Hz to 3.5 kHz, more preferably 600 Hz to 2.5 kHz) may in particular be selected in this case as the at least one formant range, or two formant ranges of the first and second formants are selected. A plurality of first and/or second formant ranges assigned to different vowels (that is to say the frequency ranges that are assigned to the first and second formants of the respective vowel) may in particular also be selected. The signal component is then ascertained for the one or more selected formant ranges, and a signal variable, correlated with the level, of the respective signal component is determined. The signal variable may in this case be the level itself, or else the possibly appropriately smoothed maximum signal amplitude. Based on a temporal stability of the signal variable, which is in turn able to be ascertained through a variance of the signal variable over an appropriate time window, and/or based on a deviation of the signal variable from its maximum value over an appropriate time window, it is then possible to make a statement as to the precision of formants to the extent that a low variance and a low deviation from the maximum level for an articulated sound (the length of the time window may in particular be selected depending on the length of an articulated sound) mean high precision.

The fundamental frequency of the speech signal is advantageously acquired in a temporally resolved manner, and a characteristic variable characteristic of the temporal stability of the fundamental frequency is ascertained as prosodic property of the speech signal. This characteristic variable may for example be ascertained based on a relative deviation of the fundamental frequency accumulated over time, or by acquiring a number of maxima and minima of the fundamental frequency over a predefined time interval. The temporal stability of the fundamental frequency is significant primarily for monotony of the speech melody and accentuation, for which reason a quantitative acquisition also allows a statement about the speech quality of the speech signal.

A variable correlated with the volume, in particular an amplitude and/or a level, is preferably acquired in a temporally resolved manner for the speech signal, in particular through appropriate analysis of the input audio signal or of a signal derived therefrom, wherein a quotient of a maximum value of the variable correlated with the volume to a mean of said variable, ascertained over a predefined time interval, is formed over the predefined time interval, and wherein a characteristic variable is ascertained as prosodic property of the speech signal on the basis of said quotient that is formed from the maximum value and the mean of the variable correlated with the volume over the predefined time interval. It is thereby possible to make a statement about a definition of the accentuation based on the indirectly acquired volume dynamics of the speech signal.

In one advantageous embodiment, at least two characteristic variables each characteristic of articulatory and/or prosodic properties are ascertained based on the analysis of the input audio signal, wherein the quantitative measure of the speech quality is formed based on a product of these characteristic variables and/or based on a weighted mean and/or a maximum or minimum value of these characteristic variables. This is advantageous in particular when a single measure of the speech quality is required or desired, or when a single measure that is intended to acquire all articulatory or all prosodic properties is desired.

Preferably, speech activity is detected and/or an SNR in the input audio signal is ascertained before the at least one articulatory and/or prosodic property of the speech signal is acquired, wherein analysis is performed with regard to the at least one articulatory and/or prosodic property of the speech signal on the basis of the detected voice activity or the ascertained SNR. The analysis of the speech quality of the speech signal may thereby be restricted to those cases in which a speech signal is actually present or in which the SNR is in particular above a predefined limit value, such that it may be assumed that sufficiently good identification of the signal components of the speech signal in the input audio signal is actually possible in the first place in order to perform appropriate rating. By contrast, in the case of a conventional signal processing operation for a sufficiently high SNR, usually no measure is taken to emphasize a speech signal or the like, even though defective speech quality, that is to say in the case of poor articulation and/or low definition of prosodic features such as emphasis, would benefit from improvement by way of the signal processing operation.

The hearing device is preferably designed as a hearing aid. The hearing aid may in this case be a monaural hearing aid or a binaural hearing aid with two local hearing aids that are to be worn by the user of the hearing aid on his respective right or left ear. The hearing aid may in particular, in addition to said input transducer, also have at least one further acousto-electric input transducer that converts sound from the surroundings into a corresponding further input audio signal, such that the at least one articulatory and/or prosodic property of a speech signal is able to be quantitatively acquired by analyzing a multiplicity of contributing input audio signals. In the case of a binaural hearing aid, two of the input audio signals that are used may each be generated in different local units of the hearing aid (that is to say respectively at the left or at the right ear). The signal processing apparatus may in this case in particular comprise signal processors of both local units, wherein respectively locally generated measures of the speech quality, depending on the considered articulatory and/or prosodic property, are preferably appropriately combined by averaging or a maximum or minimum value for both local units.

One exemplary embodiment of the invention is explained in more detail below with reference to a drawing. In the figures, in each case schematically:

Other features which are considered as characteristic for the invention are set forth in the appended claims.

Although the invention is illustrated and described herein as embodied in a method for rating the speech quality of a speech signal by way of a hearing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
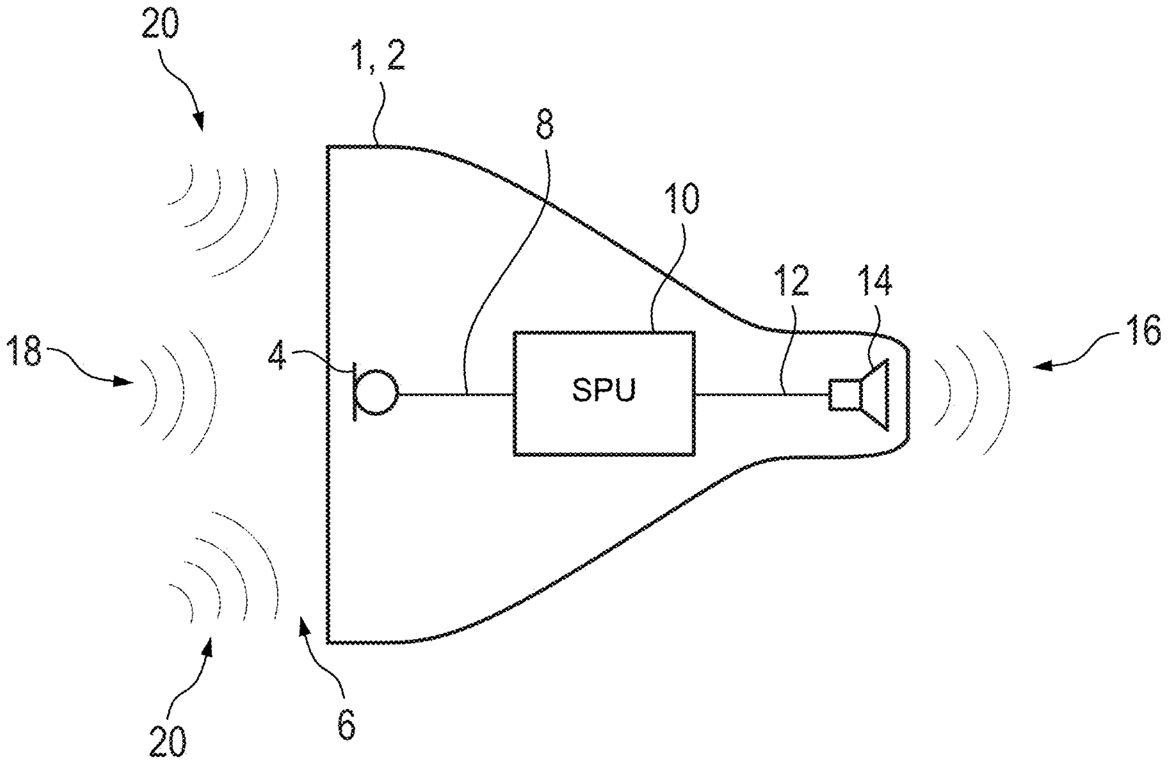
FIG. 1 shows a circuit diagram of a hearing aid that acquires a sound containing a speech signal.

FIG. 1 schematically illustrates a circuit diagram of a hearing device 1, which is designed here as a hearing aid 2.

The hearing aid 2 has an acousto-electric input transducer 4 that is designed to convert a sound 6 from the surroundings of the hearing aid 2 into an input audio signal 8. An embodiment of the hearing aid 2 having a further input transducer (not illustrated) that generates a corresponding further input audio signal from the sound 6 from the surroundings is also conceivable here. The hearing aid 2 is in this case designed as a standalone monaural hearing aid. A design of the hearing aid 2 as a binaural hearing aid having two local hearing aids (not illustrated) that are to be worn by the user of the hearing aid 2 on his respective right or left ear is also conceivable.

The input audio signal 8 is fed to a signal processing apparatus 10 of the hearing aid 2, in which the input audio signal 8 is processed appropriately, in particular in accordance with the audiological requirements of the user of the hearing aid 2 and is in the process for example amplified and/or compressed in terms of frequency band. The signal processing apparatus/unit 10 is for this purpose in particular embodied by way of an appropriate signal processor (not illustrated in more detail in FIG. 1) and a working memory able to be addressed via the signal processor. Any preprocessing of the input audio signal 8, such as for example A/D conversion and/or pre-amplification of the generated input audio signal 8, should be considered here as part of the input transducer 4.

The signal processing apparatus 10, by processing the input audio signal 8, in this case generates an output audio signal 12 that is converted into an output sound signal 16 of the hearing aid 2 by way of an electro-acoustic output transducer 14. The input transducer 4 is in this case preferably formed by a microphone, and the output transducer 14 is formed for example by a loudspeaker (such as for instance a balanced metal case receiver), but may also be formed by a bone conduction hearing device or the like.

The sound 6 from the surroundings of the hearing aid 2 that is acquired by the input transducer 4 contains, inter alia, a speech signal 18 from a speaker, not illustrated in more detail, and other sound components 20, which may comprise in particular directional and/or diffuse interfering noise (interfering sound or background noise), but may also contain noise that could be considered to be a payload signal depending on the situation, that is to say for example music or acoustic warning or information signals concerning the surroundings.

The signal processing operation on the input audio signal 8 performed in the signal processing apparatus 10 in order to generate the output audio signal 12 may in particular comprise suppression of signal components that suppress the interfering noise contained in the sound 6, or relative boosting of the signal components representing the speech signal 18 in relation to the signal component representing the other sound components 20. Frequency-dependent or wideband dynamic compression and/or amplification and noise suppression algorithms may in particular also be applied in this case.

In order to make the signal components in the input audio signal 8 that represent the speech signal 18 as audible as possible in the output audio signal 12 and nevertheless to be able to give the user of the hearing aid 2 the most natural possible auditory impression in the output sound 16, a quantitative measure of the speech quality of the speech signal 18 should be ascertained in the signal processing apparatus 10 for controlling the algorithms to be applied to the input audio signal 8. This is described with reference to FIG. 2.

Figure 2:
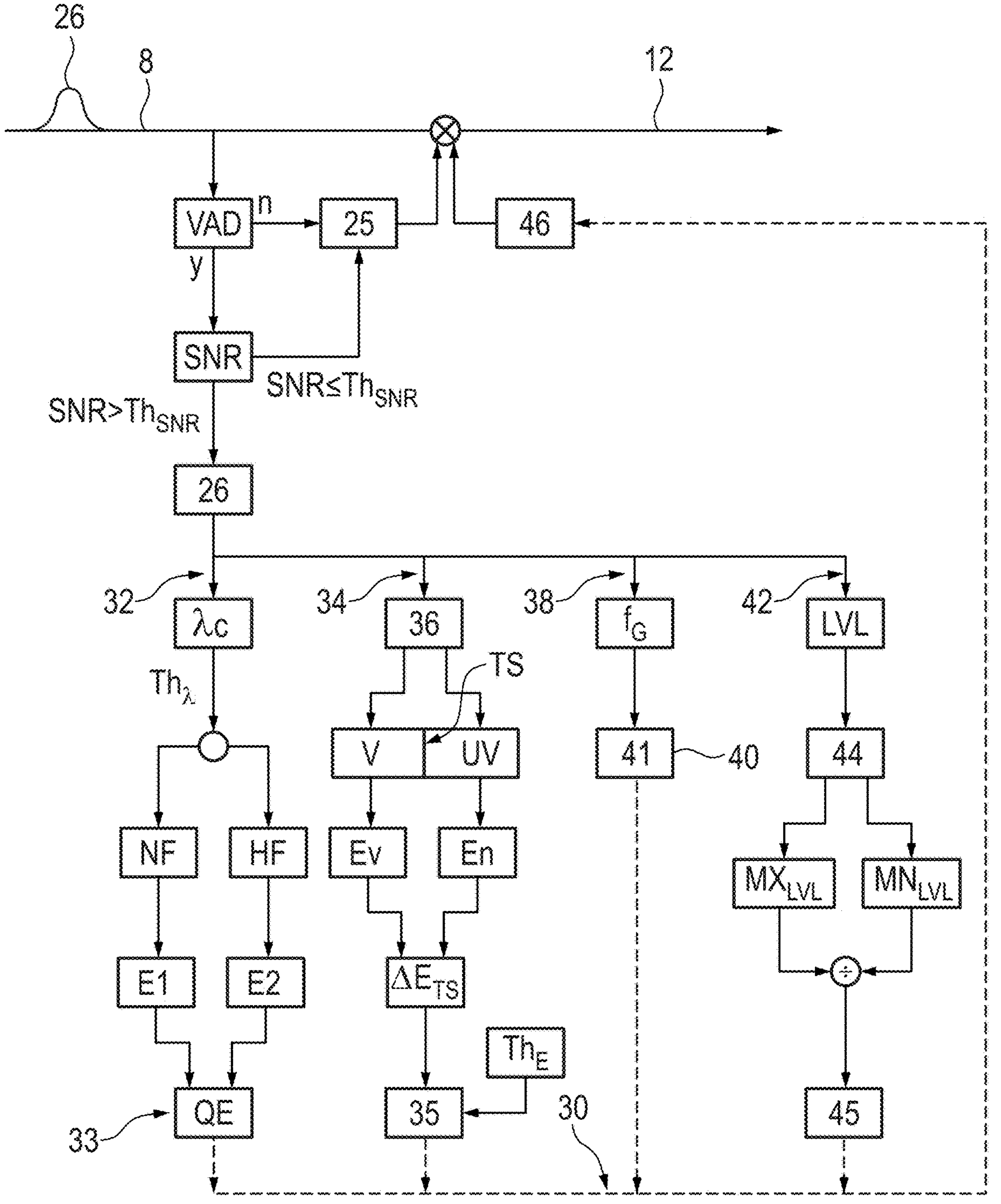
FIG. 2 shows a block diagram of a method for ascertaining a quantitative measure of the speech quality of the speech signal according to FIG. 1.

FIG. 2 shows a block diagram of a processing operation on the input audio signal 8 of the hearing aid 2 according to FIG. 1. Speech activity VAD identification is first of all performed for the input audio signal 8. If no noteworthy speech activity is present (path "n"), then the signal processing operation is performed on the input audio signal 8 in order to generate the output audio signal 12 using a first algorithm 25. The first algorithm 25, in a manner predefined beforehand, in this case rates signal parameters of the input audio signal 8 such as for example level, background noise, transients or the like, in wideband and/or in particular frequency band-wise manner, and ascertains therefrom individual parameters, for example frequency band-wise gain factors and/or compression characteristic data (that is to say primarily knee point, ratio, attack, release) that are to be applied to the input audio signal 8.

The first algorithm 25 may in particular also make provision to classify an auditory situation that is created in the sound 6, and to set individual parameters on the basis of the classification, potentially as appropriate for an auditory program provided for a specific auditory situation. In addition to this, the individual audiological requirements of the user of the hearing aid 2 may also be taken into consideration for the first algorithm 25 in order to be able to compensate for a hearing impairment of the user as well as possible by applying the first algorithm 25 to the input audio signal 8.

If, however, noteworthy speech activity is identified in the speech activity VAD identification (path "y"), then an SNR is ascertained next and compared with a predefined limit value $Th_{SNR}$. If the SNR is not above the limit value, that is to say $SNR \leq Th_{SNR}$, then the first algorithm 25 is applied again to the input audio signal 8 in order to generate the output audio signal 12. If however the SNR is above the predefined limit value $Th_{SNR}$, that is to say $SNR > Th_{SNR}$, then a quantitative measure 30 of the speech quality of the speech component 18 contained in the input audio signal 8 is ascertained for the further processing of the input audio signal 8 in the manner described below. Articulatory and/or prosodic properties of the speech signal 18 are quantitatively acquired for this purpose. The term speech signal component 26 contained in the input audio signal 8 should in this case be understood to mean those signal components of the input audio signal 8 that represent the speech component 18 of the sound 6 from which the input audio signal 8 is generated by way of the input transducer 4.

In order to ascertain said quantitative measure 30, the input audio signal 8 is split into individual signal paths.

For a first signal path 32 of the input audio signal 8, a centroid wavelength Ac is first of all ascertained and compared with a predefined limit value for the centroid wavelength $Th_{\lambda}$. If it is identified, on the basis of said limit value of the centroid wavelength $Th_{\lambda}$, that the signal components in the input audio signal 8 are of sufficiently high frequency, then the signal components are selected in the first signal path 32, possibly after appropriately selected temporal smoothing (not illustrated), for a low frequency range NF and a higher frequency range HF above the low frequency range NF. One possible split may for example be such that the low frequency range NF comprises all frequencies $f_N \leq 2500$ Hz, in particular $f_N \leq 2000$ Hz, and the higher frequency range HF comprises frequencies $f_H$ where 2500 Hz$<f_H\leq$10 000 Hz, in particular 4000 Hz$\leq f_H \leq$8000 Hz or 2500 Hz$<f_H\leq$5000 Hz.

The selection may be made directly in the input audio signal 8 or else be made such that the input audio signal 8 is split into individual frequency bands by way of a filter bank (not illustrated), wherein individual frequency bands are assigned to the low or higher frequency range NF or HF depending on the respective band limits.

A first energy E1 is then ascertained for the signal contained in the low frequency range NF and a second energy E2 is ascertained for the signal contained in the higher frequency range HF. A quotient QE is then formed from the second energy as numerator and the first energy E1 as denominator. The quotient QE, if the low and higher frequency range NF, HF are selected appropriately, may then be applied as a characteristic variable 33 that is correlated with dominance of consonants in the speech signal 18. The characteristic variable 33 thus allows a statement about an articulatory property of the speech signal components 26 in the input audio signal 8. A value of the quotient QE>>1 (that is to say QE>$Th_{QE}$ with a predefined limit value $Th_{QE}$>>1 not illustrated in more detail) may thus for example infer a high dominance of consonants, while a value QE<1 may infer a low dominance.

In a second signal path 34, a distinction 36 is made in the input audio signal 8 between voiced temporal sequences V and unvoiced temporal sequences UV based on correlation measurements and/or based on a zero crossing rate of the input audio signal 8. Based on the voiced and unvoiced temporal sequences V and UV, a transition TS from a voiced temporal sequence V to an unvoiced temporal sequence UV is ascertained. The length of a voiced or unvoiced temporal sequence may for example be between 10 and 80 ms, in particular between 20 and 50 ms.

An energy Ev for the voiced temporal sequence V prior to the transition TS and an energy En for the unvoiced temporal sequence UV following the transition TS is then in each case ascertained for at least one frequency range (for example a selection of particularly meaningful frequency bands ascertained as being suitable, for example frequency bands 16 to 23 on the Bark scale, or frequency bands 1 to 15 on the Bark scale). In this case, appropriate energies prior to and following the transition TS may in particular also be ascertained in each case separately for more than one frequency range. It is then determined how the energy changes at the transition TS, for example through a relative change $\Delta E_{TS}$ or through a quotient (not illustrated) of the energies Ev, En prior to and following the transition TS.

The measure of the change of the energy, that is to say in this case the relative change, is then compared with a limit value $Th_E$, ascertained beforehand for good articulation, for energy distribution at transitions. A characteristic variable 35 may in particular be formed based on a ratio of the relative change $\Delta E_{TS}$ and said limit value $Th_E$ or based on a relative deviation of the relative change $\Delta E_{TS}$ from this limit value $Th_E$. Said characteristic variable 35 is correlated with the articulation of the transitions from voiced and unvoiced sounds in the speech signal 18, and thus makes it possible to conclude as to a further articulatory property of the speech signal components 26 in the input audio signal 8. It is generally applicable here that a transition between voiced and unvoiced temporal sequences is articulated more precisely the faster, that is to say the more temporally definable, a change in the energy distribution takes place across the frequency ranges relevant to voiced and unvoiced sound.

For the characteristic variable 35, it is however also possible to consider an energy distribution into two frequency ranges (for example the abovementioned frequency ranges in accordance with the Bark scale, or else in the low and upper frequency range NF, HF), for example via a quotient of the respective energies or a comparable characteristic value, and to apply a change in the quotient or the characteristic value across the transition for the characteristic variable. A rate of change of the quotient or of the characteristic variable may thus for example be determined and compared with a reference value, ascertained beforehand as being suitable, for the rate of change.

Transitions from unvoiced temporal sequences may be considered in the same way in order to form the characteristic variable 35. The specific embodiment, in particular in terms of the frequency ranges and limit or reference values to be used, may generally be achieved based on empirical results regarding a corresponding significance of the respective frequency bands or groups of frequency bands.

In a third signal path 38, a fundamental frequency $f_G$ of the speech signal component 26 is acquired in a temporally resolved manner in the input audio signal 8, and a temporal stability 40 is ascertained for said fundamental frequency $f_G$ based on a variance of the fundamental frequency $f_G$. The temporal stability 40 may be used as a characteristic variable 41 that allows a statement about a prosodic property of the speech signal components 26 in the input audio signal 8. A stronger variance in the fundamental frequency $f_G$ may in this case be used as an indicator for better speech intelligibility, while a monotonic fundamental frequency $f_G$ comprises lower speech intelligibility.

In a fourth signal path 42, a level LVL is acquired in a temporally resolved manner for the input audio signal 8 and/or for the speech signal component 26 contained therein, and a temporal mean $MN_{LVL}$ is formed over a time interval 44 that is predefined in particular based on corresponding empirical findings. The maximum $MX_{LVL}$ of the level LVL is also ascertained over the time interval 44. The maximum $MX_{LVL}$ of the level LVL is then divided by the temporal mean $MN_{LVL}$ of the level LVL, and a characteristic variable 45 correlated with a volume of the speech signal 18 is thus ascertained, this allowing a further statement about a prosodic property of the speech signal components 26 in the input audio signal 8. Instead of the level LVL, another variable correlated with the volume and/or the energy content of the speech signal component 26 may also be used here.

The characteristic variables 33, 35, 41 and 45 respectively ascertained, as described, in the first to fourth signal path 32, 34, 38, 42 may then each be used individually as the quantitative measure 30 of the quality of the speech component 18 contained in the input audio signal 8, on the basis of which a second algorithm 46 is then applied to the input audio signal 8 for signal processing purposes. The second algorithm 46 may in this case be derived from the first algorithm 25 through an appropriate change of one or more signal processing parameters made on the basis of the relevant quantitative measure 30 or provide a completely standalone auditory program.

An individual value may in particular also be determined as quantitative measure 30 of the speech quality based on the characteristic variables 33, 35, 41 or 45 ascertained as described, for example through a weighted mean or a product of the characteristic variables 33, 35, 41, 45 (schematically illustrated in FIG. 2 by the combination of the characteristic variables 33, 35, 41, 45). The individual characteristic variables may in this case in particular be weighted based on weighting factors that are ascertained empirically beforehand and that are able to be determined based on the significance of the articulatory or prosodic property of the speech quality as acquired by the respective characteristic variable.

Although the invention has been described and illustrated in more detail through the preferred exemplary embodiment, the invention is not restricted to the disclosed examples, and other variations may be derived therefrom by a person skilled in the art without departing from the scope of protection of the invention.

The following is a summary list of reference numerals and the corresponding structure used in the above description of the invention:

1 Hearing device
2 Hearing aid
4 Input transducer
6 Sound from the surroundings
8 Input audio signal
10 Signal processing apparatus
12 Output audio signal
14 Output transducer
16 Output sound
18 Speech signal
20 Sound components
25 First algorithm
26 Speech signal component
30 Quantitative measure of speech quality
32 First signal path
33 Characteristic variable
34 Second signal path
35 Characteristic variable
36 Distinction
38 Third signal path
40 Temporal stability
41 Characteristic variable
42 Fourth signal path
44 Time interval
45 Characteristic variable
46 Second algorithm
$\Delta E_{TS}$ Relative change (of the energy at the transition)
$\lambda_C$ Centroid wavelength
E1 First energy
E2 Second energy
Ev Energy (prior to the transition)
En Energy (following the transition)
$f_G$ Fundamental frequency
LVL Level
HF Higher frequency range
$MN_{LVL}$ Temporal mean (of the level)
$MX_{LVL}$ Maximum of the level
NF Low frequency range
QE Quotient
SNR Signal-to-noise ratio (SNR)
$Th_\lambda$ Limit value (for the centroid wavelength)
$Th_E$ Limit value (for the relative change of the energy)
$Th_{SNR}$ Limit value (for the SNR)
TS Transition
V Voiced temporal sequence
VAD Speech activity identification
UV Unvoiced temporal sequence

The invention claimed is:

1. A method for rating a speech quality of a speech signal by a hearing device, the method comprising:
recording a sound with an acousto-electric input transducer of the hearing device, the sound containing the speech signal from surroundings of the hearing device, and converting the sound into an input audio signal;
quantitatively acquiring at least one articulatory property and/or prosodic feature of the speech signal through analysis of the input audio signal by a signal processing operation, and
deriving a quantitative measure of the speech quality based on the at least one articulatory property and/or prosodic feature; and
acquiring, as articulatory property of the speech signal, at least one of:
a characteristic variable correlated with the precision of predefined formants of vowels in the speech signal by,
ascertaining a signal component of the speech signal in at least one formant range in a frequency space,
ascertaining a signal variable correlated with a level for the signal component of the speech signal in the at least one formant range, and
ascertaining the characteristic variable based on a maximum value and/or based on a temporal stability of the signal variable correlated with the level;
a characteristic variable correlated with the dominance of consonants and/or fricatives in the speech signal by,
calculating a first energy contained in a low frequency range,
calculating a second energy contained in a frequency range higher than the low frequency range, and
forming the characteristic variable based on a ratio, and/or a ratio weighted over the respective bandwidths of the frequency ranges, of the first energy and the second energy; or
a characteristic variable correlated with the precision of transitions from voiced and unvoiced sounds by,
making a distinction between voiced temporal sequences and unvoiced temporal sequences based on a correlation measurement and/or based on a zero crossing rate,
ascertaining a transition from a voiced temporal sequence to an unvoiced temporal sequence or from an unvoiced temporal sequence to a voiced temporal sequence,
ascertaining the energy contained in the voiced or unvoiced temporal sequence prior to the transition for at least one frequency range, and ascertaining the energy contained in the unvoiced or voiced temporal sequence following the transition for the at least one frequency range, and
ascertaining the characteristic variable based on the energy prior to the transition and based on the energy following the transition.

2. The method according to claim 1, the method further comprising:
acquiring a fundamental frequency of the speech signal in a temporally resolved manner; and
ascertaining a characteristic variable characteristic of a temporal stability of the fundamental frequency as a prosodic feature of the speech signal.

3. The method according to claim 1, the method further comprising:
ascertaining at least two characteristic variables, each characteristic of articulatory properties and/or prosodic features, based on the analysis of the input audio signal; and
forming the quantitative measure of the speech quality based on a product of the ascertained at least two characteristic variables and/or based on a weighted mean of the ascertained at least two characteristic variables.

4. The method according to claim 1, the method further comprising:

detecting speech activity and/or ascertaining a signal-to-noise ratio in the input audio signal before the at least one articulatory property and/or prosodic feature of the speech signal is acquired; and performing analysis regarding the at least one articulatory property and/or prosodic feature of the speech signal based on the detected voice activity or the ascertained signal-to-noise ratio.

5. A method for rating a speech quality of a speech signal by a hearing device, the method comprising:

recording a sound with an acousto-electric input transducer of the hearing device, the sound containing the speech signal from surroundings of the hearing device, and converting the sound into an input audio signal;

quantitatively acquiring at least one articulatory property and/or prosodic feature of the speech signal through analysis of the input audio signal by a signal processing operation, and deriving a quantitative measure of the speech quality based on the at least one articulatory property and/or prosodic feature;

acquiring a variable correlated with a volume in a temporally resolved manner for the speech signal;

forming, over a predefined time interval, a quotient of a maximum value of the variable correlated with the volume to a mean of said variable ascertained over the predefined time interval; and ascertaining a characteristic variable as prosodic feature of the speech signal based on the quotient that is formed from the maximum value and the mean of the variable correlated with the volume over the predefined time interval.

6. The method according to claim 5, the method further comprising acquiring, as articulatory property of the speech signal, at least one of:

a characteristic variable correlated with the precision of predefined formants of vowels in the speech signal;

a characteristic variable correlated with the dominance of consonants and/or fricatives in the speech signal; or a characteristic variable correlated with the precision of transitions from voiced and unvoiced sounds.

7. The method according to claim 5, wherein the step of acquiring the characteristic variable correlated with the dominance of consonants in the speech signal, comprises:

calculating a first energy contained in a low frequency range;

calculating a second energy contained in a frequency range higher than the low frequency range; and forming the characteristic variable based on a ratio, and/or a ratio weighted over the respective bandwidths of the frequency ranges, of the first energy and the second energy.

8. The method according to claim 5, wherein the step of acquiring the characteristic variable correlated with precision of the transitions from voiced and unvoiced sounds, comprises:

making a distinction between voiced temporal sequences and unvoiced temporal sequences based on a correlation measurement and/or based on a zero crossing rate;

ascertaining a transition from a voiced temporal sequence to an unvoiced temporal sequence or from an unvoiced temporal sequence to a voiced temporal sequence;

ascertaining the energy contained in the voiced or unvoiced temporal sequence prior to the transition for at least one frequency range, and ascertaining the energy contained in the unvoiced or voiced temporal sequence following the transition for the at least one frequency range; and ascertaining the characteristic variable based on the energy prior to the transition and based on the energy following the transition.

9. The method according to claim 5, wherein the step of acquiring the characteristic variable correlated with the precision of predefined formants of vowels in the speech signal, comprises:

ascertaining a signal component of the speech signal in at least one formant range in a frequency space;

ascertaining a signal variable correlated with a level for the signal component of the speech signal in the at least one formant range; and ascertaining the characteristic variable based on a maximum value and/or based on a temporal stability of the signal variable correlated with the level.

10. The method according to claim 5, the method further comprising:

acquiring a fundamental frequency of the speech signal in a temporally resolved manner; and ascertaining a characteristic variable characteristic of a temporal stability of the fundamental frequency as a prosodic feature of the speech signal.

11. The method according to claim 5, the method further comprising:

ascertaining at least two characteristic variables, each characteristic of articulatory properties and/or prosodic features, based on the analysis of the input audio signal; and forming the quantitative measure of the speech quality based on a product of the ascertained at least two characteristic variables and/or based on a weighted mean of the ascertained at least two characteristic variables.

12. The method according to claim 5, the method further comprising:

detecting speech activity and/or ascertaining a signal-to-noise ratio in the input audio signal before the at least one articulatory property and/or prosodic feature of the speech signal is acquired; and performing analysis regarding the at least one articulatory property and/or prosodic feature of the speech signal based on the detected voice activity or the ascertained signal-to-noise ratio.

13. A hearing device, comprising:

an acousto-electric input transducer configured to record a sound from surroundings of the hearing device and to convert said sound into an input audio signal;

a signal processing unit configured to:

quantitatively acquire at least one articulatory property and/or prosodic feature of a component, contained in said input audio signal, of a speech signal based on analysis of said input audio signal; and derive a quantitative measure of a speech quality based on said at least one articulatory property and/or prosodic feature acquire, as articulatory property of the speech signal, at least one of:

a characteristic variable correlated with the precision of predefined formants of vowels in the speech signal by, ascertaining a signal component of the speech signal in at least one formant range in a frequency space, ascertaining a signal variable correlated with a level for the signal component of the speech signal in the at least one formant range, and ascertaining the characteristic variable based on a maximum value and/or based on a temporal stability of the signal variable correlated with the level;

a characteristic variable correlated with the dominance of consonants and/or fricatives in the speech signal by, calculating a first energy contained in a low frequency range, calculating a second energy contained in a frequency range higher than the low frequency range, and forming the characteristic variable based on a ratio, and/or a ratio weighted over the respective bandwidths of the frequency ranges, of the first energy and the second energy; or a characteristic variable correlated with the precision of transitions from voiced and unvoiced sounds by, making a distinction between voiced temporal sequences and unvoiced temporal sequences based on a correlation measurement and/or based on a zero crossing rate, ascertaining a transition from a voiced temporal sequence to an unvoiced temporal sequence or from an unvoiced temporal sequence to a voiced temporal sequence, ascertaining the energy contained in the voiced or unvoiced temporal sequence prior to the transition for at least one frequency range, and ascertaining the energy contained in the unvoiced or voiced temporal sequence following the transition for the at least one frequency range, and ascertaining the characteristic variable based on the energy prior to the transition and based on the energy following the transition.

14. The hearing device according to claim 13, configured as a hearing aid.

* * * * *